United States Patent
Papillon et al.

(10) Patent No.: US 10,310,109 B2
(45) Date of Patent: Jun. 4, 2019

(54) METHOD AND APPARATUS FOR CONFIRMATION TIME BREAK (CTB) DETERMINATION AND SHOTPOINT IN-SITU RECORDING IN SEISMIC ELECTRONIC DETONATORS

(71) Applicant: Austin Star Detonator Company, Cleveland, OH (US)

(72) Inventors: Bryan E. Papillon, Phoenixville, PA (US); Larry S. Howe, Norwalk, OH (US); Gimtong Teowee, Westlake Village, CA (US)

(73) Assignee: Austin Star Detonator Company, Cleveland, OH (US)

( * ) Notice: Subject to any disclaimer, the term of this patent is extended or adjusted under 35 U.S.C. 154(b) by 193 days.

(21) Appl. No.: 15/314,726

(22) PCT Filed: May 26, 2015

(86) PCT No.: PCT/US2015/032355
§ 371 (c)(1),
(2) Date: Nov. 29, 2016

(87) PCT Pub. No.: WO2015/187396
PCT Pub. Date: Dec. 10, 2015

(65) Prior Publication Data
US 2017/0123087 A1 May 4, 2017

Related U.S. Application Data

(60) Provisional application No. 62/009,023, filed on Jun. 6, 2014.

(51) Int. Cl.
*G01V 1/00* (2006.01)
*G01V 1/06* (2006.01)
(Continued)

(52) U.S. Cl.
CPC .............. *G01V 1/06* (2013.01); *F42D 3/06* (2013.01); *G01V 1/104* (2013.01); *G01V 2210/1299* (2013.01)

(58) Field of Classification Search
CPC .. G01V 1/06; G01V 1/104; G01V 2210/1299; F42D 3/06
See application file for complete search history.

(56) References Cited

U.S. PATENT DOCUMENTS 2,137,985 A 7/1937 Salvatori
2,160,224 A 5/1939 Minton
(Continued)

FOREIGN PATENT DOCUMENTS

EP 0066390 A1 12/1982

OTHER PUBLICATIONS

International Search Report and Written Opinion of International Application No. PCT/US2015/032355 dated Sep. 2, 2015.
(Continued)

*Primary Examiner* — Krystine E Breier
(74) *Attorney, Agent, or Firm* — Fay Sharpe LLP

(57) ABSTRACT

Seismic blasting methods and apparatus are presented in which detonator confirmation time break (CTB) is accurately determined by maintaining an applied voltage across detonator leg wires following initiation of a firing command or signal and sensing one or more electrical parameters such as voltage and/or current, and selectively identifying a CTB representing a time at which the monitored electrical parameter indicates a successful detonation.

19 Claims, 4 Drawing Sheets

(51) Int. Cl.
  *G01V 1/104* (2006.01)
  *F42D 3/06* (2006.01)

(56) References Cited

U.S. PATENT DOCUMENTS

| | | | |
|---|---|---|---|
| 2,248,587 A | 7/1941 | Seavey | |
| 2,264,596 A | 12/1941 | Shook et al. | |
| 2,285,610 A | 6/1942 | Petty | |
| 2,290,773 A | 7/1942 | Shook et al. | |
| 2,291,779 A | 8/1942 | Welty | |
| 2,297,319 A | 9/1942 | Parr, Jr. | |
| 2,326,153 A | 8/1943 | Mayne | |
| 2,331,627 A | 10/1943 | Petty | |
| 2,470,846 A | 5/1949 | Boisblanc et al. | |
| 2,641,749 A | 6/1953 | Lawrence | |
| 3,432,805 A | 3/1969 | Romberg | |
| 3,687,218 A | 9/1972 | Ritter | |
| 3,851,589 A | 12/1974 | Meyer | |
| 3,878,790 A | 4/1975 | Meyer | |
| 3,902,161 A | 8/1975 | Kiowski et al. | |
| 3,946,357 A | 3/1976 | Weinstein et al. | |
| 3,972,019 A | 7/1976 | Bassett | |
| 4,042,906 A | 8/1977 | Ezell | |
| 4,047,591 A * | 9/1977 | Ward | F41B 11/00 |
| | | | 181/107 |
| 4,053,027 A | 10/1977 | Itria | |
| 4,223,399 A | 9/1980 | Hackett | |
| 4,243,116 A | 1/1981 | Elliott, Jr. et al. | |
| 4,300,653 A | 11/1981 | Cao et al. | |
| 4,320,472 A | 3/1982 | Fort | |
| 4,324,310 A | 4/1982 | Wener et al. | |
| 4,394,616 A | 7/1983 | Browne et al. | |
| 4,405,033 A | 9/1983 | Elliott, Jr. et al. | |
| 4,427,091 A | 1/1984 | Elliott, Jr. et al. | |
| 4,497,044 A | 1/1985 | Silverman | |
| 4,511,999 A | 4/1985 | Bowden et al. | |
| 4,635,746 A * | 1/1987 | Lin | G01V 1/26 |
| | | | 181/107 |
| H000276 H * | 5/1987 | Siems | 102/293 |
| H276 H | 5/1987 | Siems | |
| 4,782,911 A * | 11/1988 | Dixon | G01V 1/26 |
| | | | 102/200 |
| 4,800,538 A * | 1/1989 | Passmore | G01V 1/223 |
| | | | 181/111 |
| 4,960,183 A | 10/1990 | Young, II | |
| 4,991,684 A | 2/1991 | Mitchell | |
| 5,062,084 A | 10/1991 | Schoepf et al. | |
| 5,714,712 A | 2/1998 | Ewick et al. | |
| 5,822,273 A | 10/1998 | Bary et al. | |
| 6,002,339 A | 12/1999 | Norris | |
| 6,188,962 B1 | 2/2001 | Morgan et al. | |
| 6,327,537 B1 | 12/2001 | Ikelle | |
| 6,553,316 B2 | 4/2003 | Bary et al. | |
| 6,704,657 B2 * | 3/2004 | Peng | G01V 1/04 |
| | | | 181/116 |
| 6,920,470 B2 | 7/2005 | Page et al. | |
| 7,016,260 B2 | 3/2006 | Bary | |
| 7,054,131 B1 * | 5/2006 | Kanth | F42D 1/055 |
| | | | 102/217 |
| 7,359,282 B2 | 4/2008 | Tulett | |
| 7,782,708 B2 | 8/2010 | Christie et al. | |
| 7,876,642 B2 | 1/2011 | Robertsson et al. | |
| 7,885,143 B2 | 2/2011 | Laycock | |
| 7,974,150 B2 | 7/2011 | Tulett et al. | |
| 8,174,927 B2 | 5/2012 | Hopperstad et al. | |
| 8,203,906 B2 | 6/2012 | Robertsson et al. | |
| 8,204,697 B2 | 6/2012 | Garvey et al. | |
| 8,331,192 B2 | 12/2012 | Robertsson et al. | |
| 8,390,979 B2 * | 3/2013 | Hurley | F42D 1/055 |
| | | | 102/217 |
| 8,439,130 B2 | 5/2013 | Degrange et al. | |
| 8,547,797 B2 | 10/2013 | Wilcox et al. | |
| 8,553,492 B2 | 10/2013 | Kimura et al. | |
| 2001/0039478 A1 | 11/2001 | Bary et al. | |
| 2002/0038183 A1 | 3/2002 | Peng et al. | |
| 2002/0129073 A1 | 9/2002 | Page et al. | |
| 2004/0225809 A1 | 11/2004 | Wee et al. | |
| 2004/0228214 A1 | 11/2004 | Tulett | |
| 2006/0256658 A1 | 11/2006 | Christie et al. | |
| 2008/0008040 A1 | 1/2008 | Laycock | |
| 2008/0205191 A1 | 8/2008 | Coste et al. | |
| 2009/0080290 A1 | 3/2009 | Ray et al. | |
| 2009/0213691 A1 | 8/2009 | Christie et al. | |
| 2010/0149911 A1 | 6/2010 | Hopperstad et al. | |
| 2011/0032798 A1 | 2/2011 | Ray et al. | |
| 2011/0083574 A1 * | 4/2011 | LeVan | F42D 1/055 |
| | | | 102/215 |
| 2011/0090759 A1 | 4/2011 | Laycock | |
| 2011/0128818 A1 | 6/2011 | Eick et al. | |
| 2011/0203846 A1 | 8/2011 | Degrange et al. | |
| 2012/0008459 A1 | 1/2012 | Coste et al. | |
| 2013/0208563 A1 | 8/2013 | Phillips et al. | |

OTHER PUBLICATIONS

Extended European Search Report of European Application No. 15803643.4-1003 dated Jan. 15, 2018, 6 pages.

* cited by examiner

METHOD AND APPARATUS FOR CONFIRMATION TIME BREAK (CTB) DETERMINATION AND SHOTPOINT IN-SITU RECORDING IN SEISMIC ELECTRONIC DETONATORS

TECHNICAL FIELD

The present disclosure involves seismic blasting technology in general, and particularly relates to confirmation time break determination and in-situ records of shotpoints in seismic electronic detonators.

BACKGROUND

Seismic exploration is a process for assessing the characteristics of underground land formations by generating and sensing seismic waves. In general, an acoustic energy source generates seismic acoustic waves which travel through subterranean formations. The waves are reflected back to the surface by formation interfaces associated with different formation densities, and the waves may also be refracted to travel along the interface before returning to the surface. Seismic detonators and associated booster charges are placed in boreholes at or near the surface to provide a seismic wave source. Geophones or other acoustic energy transducers detect the acoustic waves reflected or refracted back to the surface, where an array of such transducers is typically positioned at the surface for land surveys with individual transducers spaced from one another at known intervals and distances from the seismic source. Data from the transducers can be correlated in time with the time at which the seismic source was actuated (detonated), and analyzed to provide information regarding the structure of the earth underneath the transducers, for example, in oil and gas exploration.

The time when the seismic source detonator fires is known as the "time break", and it is desirable to confirm actual detonation of a seismic charge by providing a value known as a confirmation time break (CTB) indicating an actual time at which a seismic detonator was successfully fired, either directly as a real-time value or as a time difference between the actual firing and the time at which the firing command or signal was issued. In particular, certain applications involve a large number (e.g. thousands) of acoustic sensors or transducers connected to data acquisition systems for obtaining acoustic sensor data, and operation of the sensors and data acquisition system is expensive. Thus, enabling transducers and acquiring corresponding data is costly if a seismic detonator does not actually detonate an associated booster charge. Consequently, confirmation of actual successful seismic source detonation by way of a confirmation time break signal or value is highly desired to signal the seismic data acquisition to enable the array of transducers in the field.

In the past, the time break was usually confirmed by detecting a current surge into an electric detonator (e.g., current interruption as described in U.S. Pat. No. 3,851,589 and monitoring a derivative of current change described in U.S. Pat. No. 2,331,627), or a fixed predetermined delay after the transmission of a firing command to an electronic detonator. However, the seismic charge actually explodes some period of time after the firing signal or command, and the time varies. As a result, the reported time break does not represent the actual time of detonation, leading to inaccuracy in temporal correlation of the acoustic sensor data. Moreover, the provision of a firing signal or command does not ensure that the detonator or the seismic charge will go off, particularly if there is excessive leakage or shorts in the bus wires for electric detonators. U.S. Pat. No. 6,704,657 describes the impedance monitoring of the detonation voltage and current, with and without a small signal rf injection in electric seismic detonators. In electronic detonators, the firing energy is usually stored onboard inside the electronic detonator and the current surge cannot be easily detected as a signal for the time break. Furthermore, the issuance of the FIRE command in electronic detonator does not always result in detonation all the time, sometimes due to damage to the detonator or the wire during loading. Thus conventional time break confirmation approaches may cause a time break to be signaled to a data acquisition system, but the detonator will not actually deploy, thereby increasing the cost of seismic exploration through acquisition and storage of useless data. Thus, it is desirable to provide more reliable techniques for detection and signaling of electric and electronic detonator time break values.

Seismic exploration using seismic sources and transducers rely upon accurate mapping and knowledge of seismic source location as well as the location of individual geophones. Shotpoints are used in seismic exploration to denote the grid location record of a seismic charge containing the detonator placed specifically in the array to be explored. This may contain the geographical records and other data. The shotpoint may be an 8-digit number e.g., 60531975 or 60611975, etc., which can be associated with a particular detonator based on the location in an exploration map at which the detonator and corresponding booster charge are to be placed, and are usually stored in a data acquisition system or other external media. Consequently, once a seismic detonator is successfully fired, further steps are needed to relay the corresponding fired-detonator shotpoint back to a control station (e.g., a remote recording facility sometimes referred to as a "doghouse"), typically by manual radio communication and manual entry of the detonator ID or shotpoint. Thus, it is desirable to improve seismic exploration processes and systems to facilitate timely provision of detonator shotpoint numbers and confirmation time break values for confirmed detonations.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Instead, the primary purpose of this summary is to present some concepts of the disclosure in a simplified form prior to the more detailed description that is presented hereinafter. The disclosure relates to methods and apparatus for seismic blasting by which the foregoing and other shortcomings may be mitigated or overcome for improved reliable CTB determination and signaling which can be used in connection with electric, non-electric and electronic detonators. In addition, the present disclosure advantageously provides for storage of shotpoint information in-site within a memory of an electronic detonator for automated reading or retrieval by a seismic blasting machine, thereby facilitating timely reporting of the shotpoint information and an accurate CTB to a data acquisition system or other external system. In various implementations, the shotpoint can be transmitted to the data acquisition system or doghouse (remote recording facility) when first obtained by the seismic blasting machine, followed by a transmission of the CTB upon successful operation of the detonator, or these values can be reported together after successful detonation.

Methods are provided for CTB value generation in a seismic blasting system according to one or more aspects of the present disclosure. The methods include applying a voltage from a seismic blasting machine across a pair of wires connected to a seismic detonator, and providing a fire command or a firing signal from the blasting machine to the detonator. The method further includes sensing one or more electrical parameters while maintaining the applied voltage for a non-zero predetermined time after the firing command or firing signal was provided, as well as determining whether the sensed electrical parameter indicates a successful detonation of an explosive charge associated with the detonator, and if so, identifying a confirmation time break value representing a time when the sensed electrical parameter indicates a successful detonation.

A seismic blasting system data reporting method is provided according to further aspects of the disclosure, including using a seismic blasting machine to electronically obtain detonator data including at least one of a serial ID and a shot point from a connected seismic detonator, and to transmit the detonator data from the seismic blasting machine to an external system. In certain embodiments, the seismic blasting machine is used to attempt to initiate detonation of the seismic detonator and selectively identify a confirmation time break value associated with the attempted detonation, and may also transmit the confirmation time break value from the seismic blasting machine to the external system. In various embodiments, moreover, the seismic blasting machine may be used to determine whether the seismic detonator has been successfully detonated, and if so to identify a confirmation time break value associated with the detonation. The method in certain embodiments may further include electronically reporting a successful or unsuccessful detonation including transmission of the detonator data from the seismic blasting machine to an external system, where the external system in certain embodiments is a remote recording facility, a data acquisition system and/or a control system.

The seismic blasting machine and methods in further embodiments may also include local storage of shotpoint in the memory of the seismic blasting machine, alone or in combination with storage, determination, and/or subsequent transmission of a confirmation time break value.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION

Figure 1:
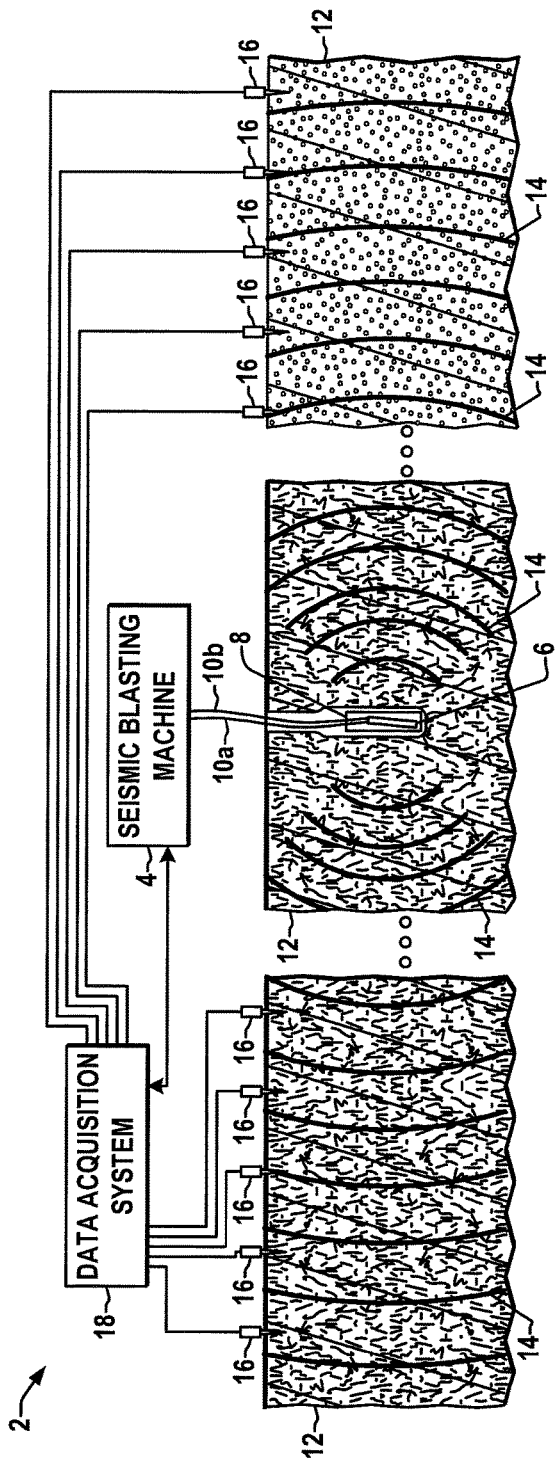
FIG. 1 is a partial sectional side elevation view illustrating a seismic exploration system with a seismic blasting machine connected to a detonator with a booster charge in a borehole for generating seismic waves, and an array of seismic transducers connected to a data acquisition system.

Referring now to the figures, several embodiments or implementations of the present disclosure are hereinafter described in conjunction with the drawings, wherein like reference numerals are used to refer to like elements throughout, and wherein the various features and plots are not necessarily drawn to scale.

FIG. 1 illustrates an exemplary seismic blasting system 2 for seismic exploration, with a seismic blasting machine 4 connected by wires 10a and 10b to an electric or electronic detonator 6 located within or proximate to a booster charge 8 of explosive materials in a borehole below the surface of the ground 12. As seen in FIG. 1, the detonator 6 and booster charge 8 are activated or "fired" by the seismic blasting machine 4 to generate a seismic wave 14 that travels in the ground 12, with reflection and refraction occurring at interfaces between ground structures of different densities. The resulting waves 14 are sensed by acoustic transducers such as geophones 16 staked into the surface of the ground 12, where the transducers 16 provide output signals to a data acquisition system 18. In a typical configuration, the data acquisition system 18 is remote from the seismic blasting machine 4, with communications connections therebetween allowing the blasting machine 4 and the data acquisition system 18 to exchange signals and information. In operation, the waves 14 are detected by the transducers 16 and the transducer data is recorded on magnetic tapes, hard drives, or other storage media of the data acquisition system 18 for subsequent data processing to determine subsurface geological structures, for example, to potentially identify structures favorable for accumulation of oil and gas in one non-limiting application.

Figure 2:
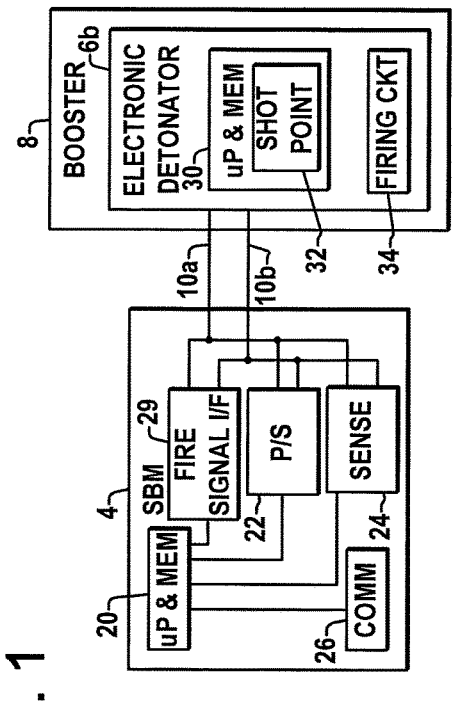
FIG. 2 is a schematic diagram illustrating an exemplary seismic blasting machine with a firing circuit for actuating a connected electric detonator as well as a power supply and a sense circuit for detection of actual detonation.
Figure 3:
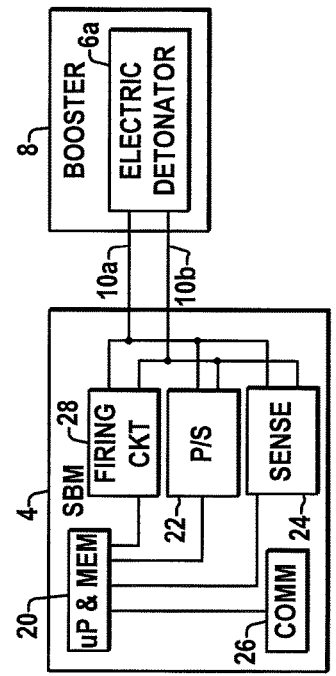
FIG. 3 is a schematic diagram illustrating another seismic blasting machine with a power supply and sense circuit for issuing a fire signal to an electronic detonator and for detecting actual operation of the detonator.
Figure 4:
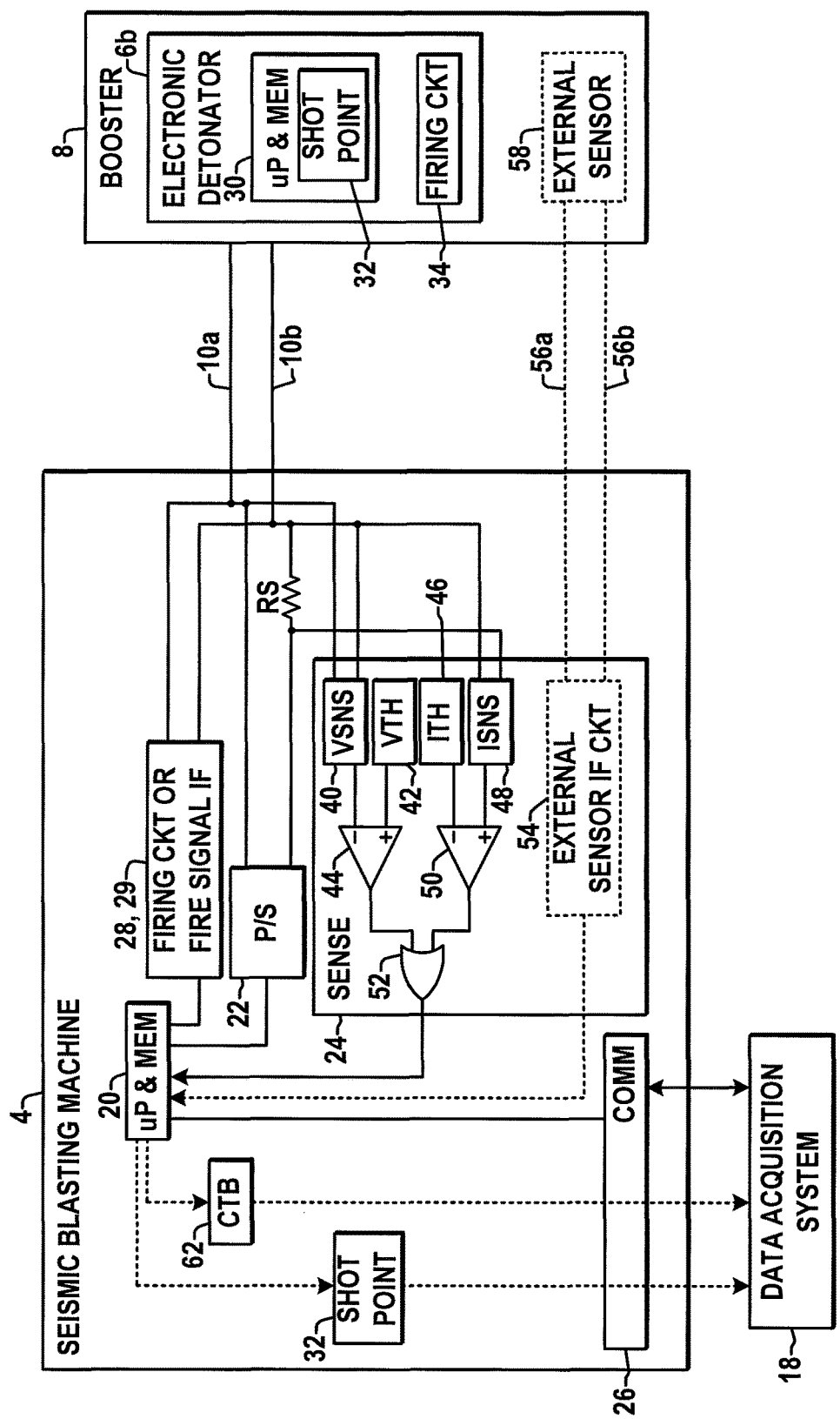
FIG. 4 is a detailed schematic diagram illustrating an exemplary sense circuit for detecting actual detonation by monitoring a voltage across leg wires and/or a current flowing through the leg wires following issuance of a firing signal or command.

Referring also to FIGS. 2-4, FIGS. 2 and 3 illustrate exemplary components of different embodiments of the seismic blasting machine 4 in order to operate an electric detonator 6a (FIG. 2) or an electronic detonator 6b (FIG. 3), and to selectively identify or generate a confirmation time break (CTB) number or value 62 (FIG. 4). The seismic blasting machine 4 includes one or more processors and associated electronic memory 20, as well as a communications interface 26 operative to provide communications between the processor 20 and an external system such as the data acquisition system 18 through any suitable wired and/or wireless communications interconnections. For operation with an electric detonator 6a (FIG. 2), the seismic blasting machine 4 includes a firing circuit 28, such as a chargeable capacitor (e.g., 100 µF capacitor charged to 450 V) with suitable switching circuitry to selectively discharge the capacitor through the leg wires 10 to send a large current pulse as a firing signal to the electric detonator 6a. In the case of an electronic detonator 6b (FIG. 3), the blasting machine 4 includes a fire signaling interface 29 operatively connected to the leg wires 10 to provide a fire command such as an encrypted signal through the wires 10 to a processor 30 of the electronic detonator 6b, where the detonator itself includes an on-board firing circuit 34 (e.g., electronic ignition module or EIM board) operable in response to receipt of the firing command to activate the detonator 6b. In addition, as further discussed below, the exemplary electronic detonator 6b in FIG. 3 includes an electronic memory operatively coupled with the processor 30 in which a shotpoint 32 is stored in certain embodiments.

In accordance with certain aspects of the present disclosure, the seismic blasting machine 4 further includes a power supply 22, in one example a DC power supply with positive and negative terminals connected to the leg wires 10, along with a sense circuit 24 connected to the leg wires 10 to sense one or more electrical parameters associated with the connected detonator 6. In one non-limiting example, the power supply 22 provides a DC voltage to the leg wires 10 for a predetermined time TMAX, and the illustrated sense circuit 24 includes voltage and current sensing capabilities as described further below in connection with FIG. 4. As seen in FIGS. 2 and 3, moreover, the firing circuit 28 in FIG. 2 (or the fire signal interface circuitry 29 in FIG. 3), as well as the power supply 22 and the sense circuit 24 are operated under control of the processor 20 of the seismic blasting machine 4. The power supply 22 operates under control of the processor 20 to apply a voltage across the wires 10 connected to the detonator 6, and the firing apparatus (whether a powered firing circuit 28 or a fire signal command interface circuit 29) operates under control of the processor 20 in order to selectively provide a firing command or a firing signal from the seismic blasting machine 4 to the seismic detonator 6. The sensing circuit 24 is operatively coupled with the processor 20 and senses one or more electrical parameters while the processor 20 maintains the applied voltage from the power supply 22 for a non-zero predetermined time, referred to herein as TMAX after a firing command or firing signal is provided to the detonator 6.

The processor 20, moreover, is programmed to automatically determine whether the sensed electrical parameter indicates a successful detonation of an explosive charge 8 associated with the connected seismic detonator 6, and if so, selectively identifies a confirmation time break value representing the time when the sensed electrical parameter indicates a successful detonation of the explosive booster charge 8. The processor 20 in certain implementations responds to an external command through the communications interface 26 (e.g., from a blasting control center, from the data acquisition system 18, etc.) or from an included user interface (not shown) to attempt to initiate a firing operation, and accordingly actuates the firing circuit 28 (FIG. 2) or transmits a firing signal via the interface 29 (FIG. 3). In addition, the processor 20 in the illustrated embodiments activates the power supply 22 and maintains provision of an applied voltage via the power supply 22 for a time following initiation of the detonator firing signal or command, while the sense circuit 24 senses one or more electrical parameters via the leg wires 10 and/or via an optional external sensor 58 disposed proximate the detonator 6 and connected to an external sensor interface circuit 54 via extra leg wires 56a and 56b as seen in FIG. 4.

As best seen in FIG. 4, one embodiment of the sense circuit 24 includes a voltage sensing circuit 40 providing a sensed voltage signal VSNS as an inverting input to a first comparator 44 for comparison with a voltage threshold signal 42 (VTH) connected to the comparator non-inverting input. In addition, this embodiment further includes a sense resistor RS connected between the second leg wire 10b and the return terminal of the power supply 22, and the sense circuit 24 includes a current sensing circuit 48 coupled to sense the voltage across the sense resistor RS, and thereby provide a current sense signal ISNS to a non-inverting input of a second comparator 50 for comparison with a current threshold signal 46 ITH. The outputs of the first and second comparators 44 and 50 are connected to an OR gate 52, which in turn provides a detonation detection output signal to the blasting machine processor 20 as shown in FIG. 4.

In response to receipt of a successful detonation signal from the sense circuit 24, the processor 20 in certain embodiments determines a current time and time stamps the detonation by sending a confirmation time break value or number 62 indicating or otherwise representing the time when the sensed electrical parameter indicated a successful detonation of the explosive charge 8 proximate to the fired detonator 6. Any suitable CTB number or value 62 can be generated by the processor 20 in various embodiments. For example, the processor 20 may record a current time at which the firing signal or command is generated via the circuitry 28, 29, and determine a difference (e.g., in milliseconds) between that time and the time at which the confirmation signal is received from the sense circuit 24, and provide this "Delta" as the CTB number or value 62. Using the time at which the firing signal or command was generated and the Delta value, the actual time at which the detonator successfully operated can be determined by the data acquisition system 18 or other external device. In another possible implementation, the seismic blasting machine 4 and data acquisition system 18 cooperatively correlate the initiation of the firing signal or command, with the seismic blasting machine 4 providing a CTB message to the data acquisition system 18 indicating that a proper detonation has been sensed via the sensing circuit 24, in which the receipt of such a CTB message 62 itself represents the confirmed time break for use by the data acquisition system 18 (e.g., such a CTB message 62 need not include an actual time value in all embodiments).

In certain embodiments, moreover, the seismic blasting machine 4 may signal the data acquisition system 18 (e.g., via the communications interface 26) that a firing signal or command has been issued, and the data acquisition system 18 may be programmed in certain implementations to await a subsequent receipt of a CTB number, value, or message 62, whereupon the data acquisition system 18 activates the array of transducers 16 and begins acquiring sensor data from the transducers 16. In this regard, the operation of the seismic blasting machine 4 in the disclosed embodiments advantageously refrains from sending a CTB value or message 62 until and unless the sense circuit 24 indicates a successful firing by the detonator 6. In this manner, the blasting machine 4 advantageously avoids or mitigates the possibility of acquisition and storage of useless data in the event that a firing signal or command was issued but the connected detonator 6 did not successfully detonate the booster explosive charge 8.

The blasting machine 4 in certain embodiments, moreover, may report a successful detonation including the CTB value 62 from the blasting machine 4 to an external system (e.g., data acquisition system 18) if the sensed electrical parameter indicates a successful detonation. In addition, certain embodiments of the blasting machine 4 may also report an unsuccessful detonation from the seismic blasting machine 42 such an external system 18 if the sensed electrical parameter does not indicate a successful detonation within the non-zero predetermined time TMAX after the firing command or firing signal was issued. In certain embodiments, moreover, the blasting machine 4 reports detonator data, such as shot point and/or serial ID to an external system 18 without any CTB value 62. In certain embodiments, the CTB value 62 can be signaled is a real-time analog signal from the seismic blaster 4 to the external system 18, and/or the CTB value 62 can be provided through wired and/or wireless communications to the external system 18 is a digital value. In one possible implementation, the processor 20 is programmed to maintain provision of the applied voltage via the power supply 22 for 10 ms or more following issuance of the firing signal or command, such as about 14 ms in one non-limiting implementation. The predetermined time is preferably set such that it exceeds with a certain margin of error a typical range of detonation times, including the variability in the timing between issuance of a firing signal or command and successful operation of the detonator 6.

Figure 5:
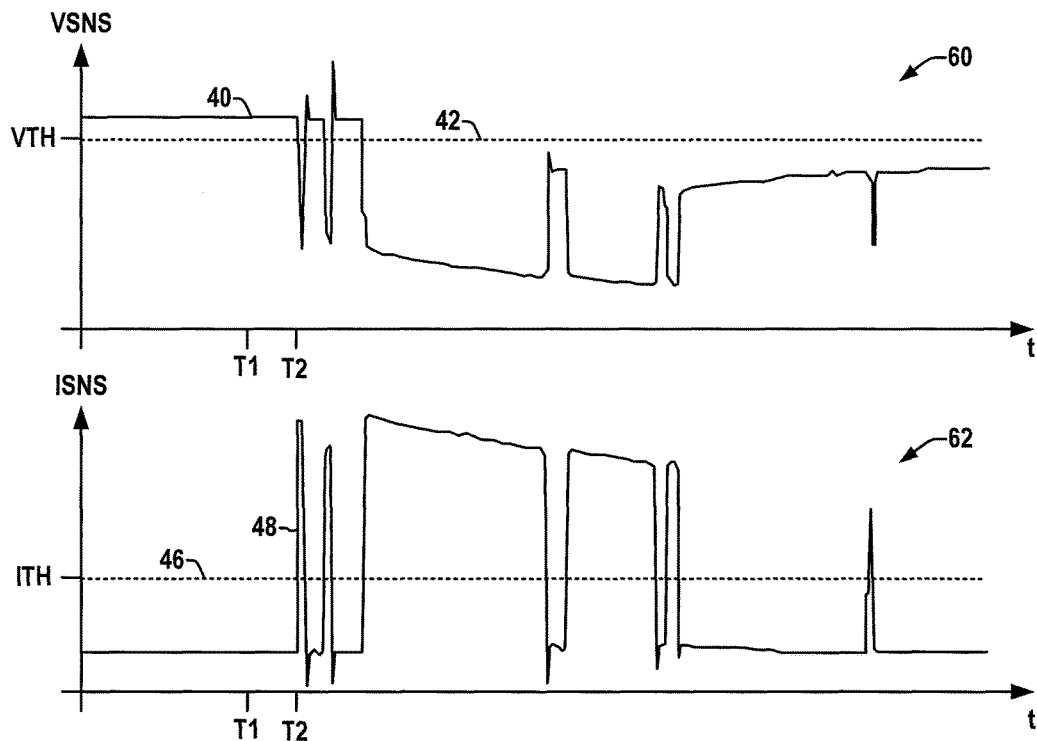
FIG. 5 is a graph showing sensed voltage and sensed current signals and corresponding detection thresholds in the seismic blasting machine of FIG. 4.

Referring to FIG. 5, in operation of certain embodiments, the processor 20 of the seismic blasting machine 4 activates the power supply 22 in order to provide a voltage from the blasting machine 4 across the pair of wires 10 to the connected seismic detonator 6, and thereafter provides the firing command or firing signal to the detonator 6. In other possible implementations, the activation of the power supply 22 can be at the same time the firing signal or command is issued, or some short time thereafter. As seen in FIG. 5, one possible detection technique employed by the sense circuit 24 includes monitoring the voltage across the leg wires 10a and 10b via the voltage sensing circuit 40 in FIG. 4, and comparison of this sensed voltage VSNS with a voltage threshold VTH 42. The threshold 42 can be a predetermined voltage reference in certain embodiments, connected to the non-inverting input of the comparator 44 is shown in FIG. 4. As seen in the sensed voltage graph 60 in FIG. 5, a firing signal or command is issued at time T1, and thereafter the sensed voltage 40 undergoes a dip at time T2, transitioning below the threshold 42. This causes the comparator 44 to provide a logic "1" output (e.g., HIGH) to the input of the OR gate 52, thereby causing the output of the OR gate 52 to be an active (e.g., HIGH) state to signal the processor 20 that the sensed voltage indicates successful detonation of the explosive charge 8. The processor 20 of the seismic blasting machine 4 accordingly timestamps T2 and issues this as the CTB number or value 62. As previously mentioned, other implementations are possible, for example, with the processor 20 issuing a time value T2−T1 as the CTB number or value 62.

As further shown in the graph 62 of FIG. 5, the illustrated sense circuit 24 also monitors the current flowing through the lead wires 10 by sensing the voltage across the sense resistor RS via the current sense circuit 48 providing a signal input ISNS to the non-inverting input of the second comparator 50 for comparison with a corresponding current threshold input 46 ITH. As seen in FIG. 5, following issuance of the firing signal or command at T1, the monitored current signal 48 undergoes an upward spike at T2, thereby indicating that the detonator successfully caused explosion of the booster charge 8. This causes the output of the comparator 50 (e.g., FIG. 4) to go active (e.g., HIGH), thereby causing the OR gate 52 to output an active (e.g., HIGH) signal to the processor 20 of the blasting machine 4. As with the above described voltage sense threshold 42, the current sense threshold 46 may be a predetermined value, such as a fixed voltage reference within the sensing circuitry 24 provided as an inverting input to the comparator 50. In certain implementations, moreover, a dynamic baseline system of the blasting machine 4 may be used to establish a signal level threshold for one or both of the voltage threshold 42 and the current threshold 46 in order to mitigate the potential for false detonation signals caused by low-level noise in the blasting machine 4.

The inventors have appreciated that successful operation in a seismic survey operation requires explosion of the booster charge 8, in addition to proper operation of the detonator 6. In this regard, operation of the detonator 6 creates a shock wave within the explosive material of the booster charge 8. This detonator shock, in turn, ideally causes explosion of the booster charge material 8, resulting in creation of plasma which is manifested as a sudden decrease in impedance between the leg wires 10a and 10b. The sense circuitry 24 in the seismic blasting machine 4 of the illustrated embodiments detects this impedance change by threshold comparison of one or more sensed electrical parameters (e.g., voltage, current, etc.), to detect a voltage dip (e.g., graph 60 in FIG. 5) and/or a current spike (graph 62). Any other suitable electrical parameter can be sensed based on connection of the sense circuitry 24 with one or both of the leg wires in various embodiments. For instance, any suitable impedance detection circuitry 24 can be used by which a change in leg wire circuit impedance can be detected for providing a corresponding confirmation signal to the processor 20 when a successful detonation has been sensed.

As seen in FIG. 4, an external sensor 58 may be provided in the borehole along with the booster charge 8 and the detonator 6, where the sensor 58 is connected by additional leg wires 56 to an external sensor interface circuit 54 in the blasting machine 4, to provide a corresponding external sensor signal to the processor 20. For example, an extra set of leg wires 56 may be provided in parallel with the detonator leg wires 10, and indeed may be wrapped around the detonator 6 in certain implementations, with the external sensor interface circuitry 54 connecting one end (e.g., wire 56b) to a circuit ground and the other end (e.g., 56a) through a pull-up resistor to a positive supply voltage, where the external sensor 58 is merely a short across the remote ends of the leg wires 56. In this case, the sense circuit 24 monitors the voltage of the first leg wire 56a which is connected to circuit ground through the second leg wire 56b in normal operation, and thereafter would be pulled high through the pull-up resistor if the remote end of the leg wire pair 56 is destroyed upon successful detonation by the detonator 6.

In another possible example, a piezo sensor is mounted outside the detonator shell and is connected to corresponding leg wires 56, or such a sensor may be mounted inside an electronic ignition module (EIM) circuit board (e.g., firing circuit 34) in an electronic detonator 6b (FIG. 4), with the output of the sensor providing a detectable voltage spike on the leg wires 56a, 56b upon successful detonation, with the external sensor interface circuit 54 implementing a voltage comparison of the sensed voltage and a corresponding threshold. In another possible embodiment, an external sensor 58 may detect a light output from a photocell, CdS, PMT, etc., and provide a corresponding signal along the leg wires 56 to the external sensor interface circuitry 54, which will undergo a detectable signal pulse upon successful detonation.

In a further non-limiting example, the seismic blasting machine 4 includes an RF signal generator within the external sensor interface circuit 54, which provides a microwave signal to the external sensor leg wires 56, with the external sensor 58 in such embodiments including a microwave reflector impedance which undergoes a detectable change upon successful detonation. In this case, the sensor interface circuit 54 monitors a reflected signal at the leg wires 56 and detects a change in a reflected signal to selectively identify a successful detonation, and accordingly signals the processor 20. In other possible implementations, the sense circuit 24 detects voltage spikes and/or disturbances in voltages at the leg wires 10 relative to ground, to thereby indicate successful detonation based on the high voltage plasma formation during detonation. Various other sensing implementations are possible, wherein the described embodiments are merely examples.

Figure 6:
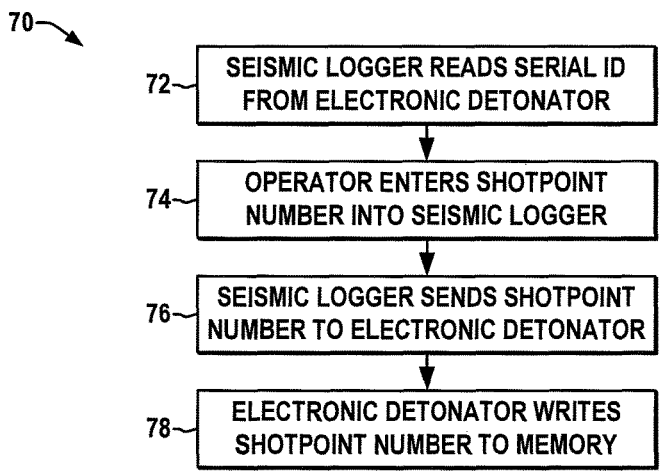
FIG. 6 is a flow diagram illustrating an exemplary process for entry and programming of a shotpoint number or value into an electronic detonator in accordance with one or more aspects of the disclosure.

Referring also to FIG. 6, in accordance with further aspects of the disclosure, electronic detonators 6b are provided with electronic memory for in situ storage of a shot point number 32. FIG. 6 provides a flow chart 70 illustrating programming of an electronic detonator 6b. Although the exemplary method 70 and other methods of this disclosure are illustrated and described hereinafter in the form of a series of acts or events, it will be appreciated that the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated method 70 and other methods of the disclosure may be implemented in hardware, processor-executed software, or combinations thereof, such as in the exemplary seismic blasting machine 4 and electronic detonator 6b shown in FIG. 4, and may be embodied in the form of computer executable instructions stored in a non-transitory computer readable medium, such as in the memory 20, 30 of the blasting machine 4 and/or of the electronic detonator 6b in non-limiting examples.

At 72 in FIG. 6, a seismic logger (not shown) reads a serial ID from an electronic detonator 6b, such as during a logging operation. At 74, an operator inputs a shot point number into the seismic logger, and the logger sends the shotpoint number to the electronic detonator at 76 for storage or "writing" to an in situ memory at 78 in the electronic detonator 6b. In this manner, the shotpoint 32 is stored within the electronic detonator 6b as shown in FIG. 4, and the seismic blasting machine 4 can read this information (e.g., alone or together with a serial ID or other information) from the detonator 6 while connected to the blasting machine 4. Thus, the processor 20 of the blasting machine 4 can send the shotpoint 32 to an external device such as the data acquisition system 18 as illustrated in FIG. 4 at any suitable time during the seismic blasting operation. In addition, as previously mentioned, the seismic blasting machine can determine and locally store a CTB value 62 in its memory 20, and can transmit this to the data acquisition system or other external device 18 via the communication interface 26. Moreover, the seismic blasting machine 4 is configured in certain embodiments to locally store any or all of the serial ID obtained from the detonator 6, a shot point number obtained from the detonator 6, the CTB value 62 or other detonator data in the local memory 20 of the blasting machine 4, and may transmit any or all of these values, separately or in combination, to an external system such as a remote recording facility, a data acquisition system (e.g., system 18) or other control system, for example, in a field recording station or doghouse in various embodiments. These features advantageously allow an operator performing recording operations to record data to match with a logger record of a shotpoint, serial ID, or other detonator data and/or CTB information.

Figure 7:
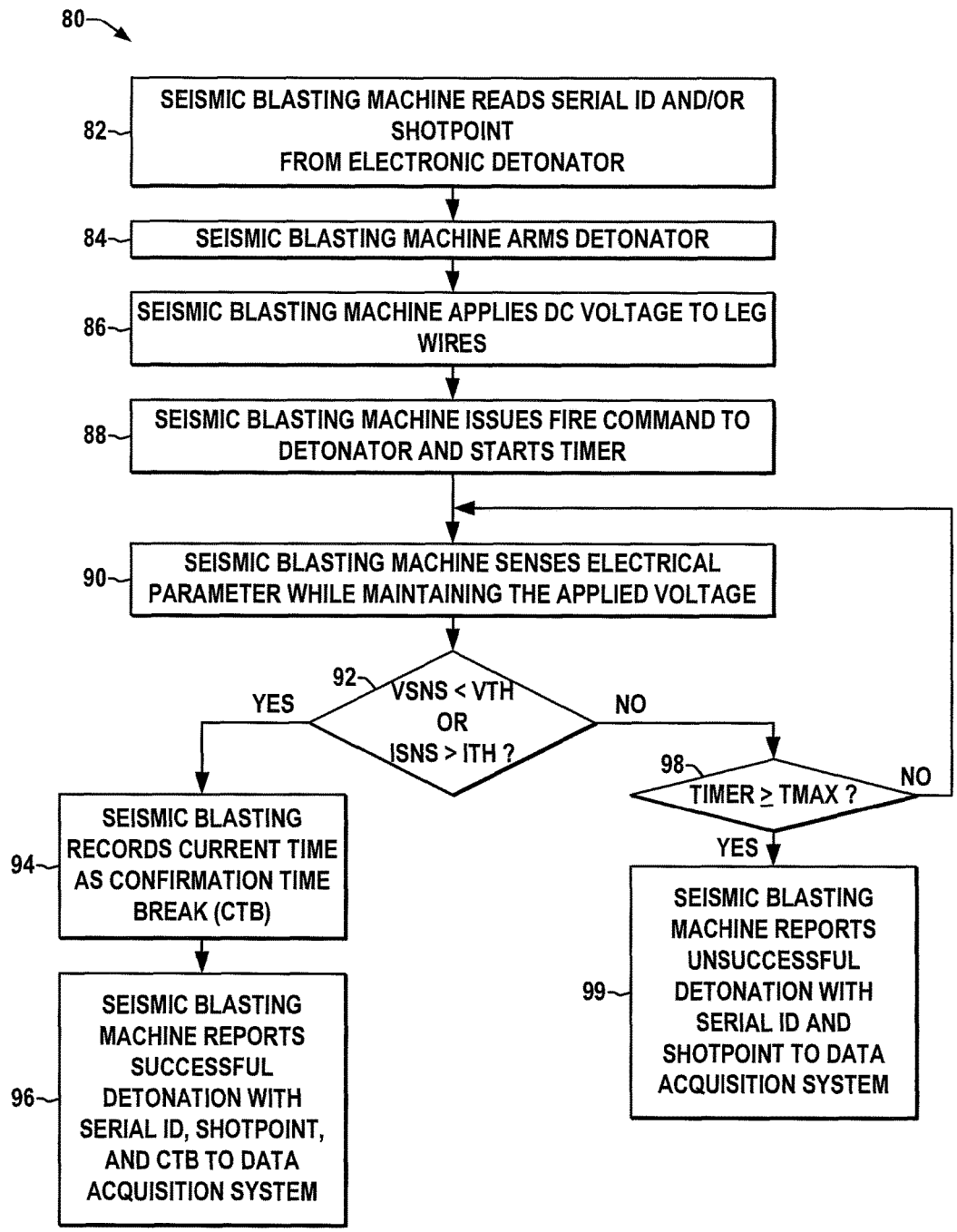
FIG. 7 is a flow diagram illustrating an exemplary method for generating a confirmation time break (CTB) value in a seismic blasting system according to further aspects of the disclosure.

Referring also to FIG. 7, a process 80 is illustrated for operation of a seismic blasting system 2, and for generating a CTB value 62. At 82 in FIG. 7, the blasting machine 4 reads a serial ID and/or shotpoint 32 from a connected electronic detonator (e.g., detonator 6b in FIGS. 3 and 4). At 84, the seismic blasting machine 4 arms the detonator, for example, with the firing circuit 34 being charged with suitable energy for initiating a detonation. A DC voltage is applied at 86 from the seismic blasting machine 4 to the leg wires 10, for example, with the blasting machine processor 20 activating the power supply 22 in FIG. 4.

At 88 in FIG. 7, the seismic blasting machine 4 issues a fire command to the detonator 6b and starts a timer in one embodiment. At 90, the seismic blasting machine 4 senses one or more electrical parameters while maintaining the applied voltage, and a determination is made by the processor 20 at 92 in FIG. 7 as to whether the sensed electrical parameter indicates a successful detonation of an explosive charge 8 associated with the seismic detonator 6. As discussed above, the determination at 92 in one non-limiting embodiment includes determining whether a sensed voltage VSNS is less than a voltage threshold VTH and/or determining whether a sensed current ISNS exceeds a current threshold ITH.

If a successful detonation is detected (YES at 92), the seismic blasting machine 4 records the current time as the CTB at 94, and reports a successful detonation at 96, which report can be a message in certain embodiments including a previously read detonator serial ID, shotpoint 32 and CTB value 62 to a data acquisition system or other external device 18. If no successful detonation has been detected (NO at 92), the processor 20 of the blasting machine 4 determines at 98 whether the timer has exceeded a predetermined time period TMAX, and if not (NO at 98), returns to continue sensing the electrical parameter(s) while maintaining the applied voltage at 92. If the designated amount of time has elapsed with no successful detonation having been sensed (YES at 98), the seismic blasting machine 4 reports an unsuccessful detonation attempt at 99 in FIG. 7, for example, via a message to the data acquisition system 18 that may include the detonator serial ID and shotpoint 32. In this manner, the data acquisition system immediately knows that a particular detonator was tried and did not successfully detonate the associated charge 8, whereby the system 18 may refrain from gathering, and/or discard, and any associated data obtained from the transducers 16.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software and/or firmware, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

The following is claimed:

1. A method of generating a confirmation time break value in a seismic blasting system, the method comprising:
   applying a voltage from a seismic blasting machine across a pair of wires connected to a seismic detonator;
   providing a firing command from the seismic blasting machine to the seismic detonator;
   sensing at least one electrical parameter while maintaining the applied voltage from the seismic blasting machine across the pair of wires for a non-zero predetermined time after provision of the firing command;
   determining whether the sensed electrical parameter indicates a successful detonation of an explosive charge associated with the seismic detonator; and
   if the sensed electrical parameter indicates a successful detonation, using the seismic blasting machine, selectively identifying a confirmation time break value representing a time when the sensed electrical parameter indicates a successful detonation of the explosive charge;
   wherein the sensed electrical parameter is a reflected electrical signal generated by reflection from an impedance of the seismic detonator of an electrical signal provided by the seismic blasting machine, and wherein determining whether the sensed electrical parameter indicates a successful detonation comprises determining whether the reflected electrical signal ceases to be received by the seismic blasting machine within the non-zero predetermined time after provision of the firing command.

2. The method of claim 1, comprising selectively reporting a successful detonation including the confirmation time break value from the seismic blasting machine to an external system if the sensed electrical parameter indicates a successful detonation.

3. The method of claim 2, comprising selectively reporting the confirmation time break value as an analog signal or a digital value.

4. The method of claim 2, comprising selectively reporting an unsuccessful detonation from the seismic blasting machine to the external system if the sensed electrical parameter does not indicate a successful detonation within the non-zero predetermined time after provision of the firing command.

5. The method of claim 4, comprising:
   using the seismic blasting machine, reading a shot point or serial ID from the seismic detonator prior to providing the firing command; and
   selectively reporting an unsuccessful detonation including the shot point or serial ID from the seismic blasting machine to the external system if the sensed electrical parameter does not indicate a successful detonation within the non-zero predetermined time after provision of the firing command.

6. The method of claim 2, comprising:
   using the seismic blasting machine, reading a shot point or serial ID from the seismic detonator prior to providing the firing command; and
   selectively reporting a successful detonation including the confirmation time break value and the shot point or serial ID from the seismic blasting machine to the external system if the sensed electrical parameter indicates a successful detonation.

7. The method of claim 1, wherein the sensed electrical parameter is a voltage across the pair of wires, and wherein determining whether the sensed electrical parameter indicates a successful detonation comprises determining whether the voltage across the pair of wires declines below a non-zero predetermined voltage threshold, the predetermined voltage threshold being less than the applied voltage from the seismic blasting machine.

8. The method of claim 1, wherein the sensed electrical parameter is a current flowing in at least one of the pair of wires, and wherein determining whether the sensed electrical parameter indicates a successful detonation comprises determining whether the current is more than a predetermined threshold.

9. The method of claim 1, comprising storing the confirmation time break value in the seismic blasting machine if the sensed electrical parameter indicates a successful detonation.

10. The method of claim 1, comprising:
    using the seismic blasting machine, reading a shot point or serial ID from the seismic detonator prior to providing the firing command; and
    storing the shot point or serial ID in the seismic blasting machine.

11. A seismic blasting machine, comprising:
    at least one processor and an associated memory;
    a power supply, under the control of the at least one processor, operative to apply a voltage across a pair of wires connected to a seismic detonator;
    a firing apparatus coupled with the pair of wires and, under the control of the at least one processor, operative to selectively provide a firing command from the seismic blasting machine to the seismic detonator; and
    a sensing circuit coupled with the pair of wires and operative to sense at least one electrical parameter while the at least one processor maintains the applied voltage from the power supply across the pair of wires for a non-zero predetermined time after provision of the firing command;
    wherein the at least one processor is programmed to:
       determine whether the sensed electrical parameter indicates a successful detonation of an explosive charge associated with the seismic detonator, and
       if the sensed electrical parameter indicates a successful detonation, to selectively identify a confirmation time break value representing a time when the sensed electrical parameter indicates a successful detonation of the explosive charge; and
    wherein the sensed electrical parameter is a reflected electrical signal generated by reflection from an impedance of the seismic detonator of an electrical signal provided by the seismic blasting machine, and wherein determining whether the sensed electrical parameter indicates a successful detonation comprises determining whether the reflected electrical signal ceases to be received by the seismic blasting machine within the non-zero predetermined time after provision of the firing command.

12. The seismic blasting machine of claim 11, wherein the at least one processor is programmed to report a successful detonation including the confirmation time break value from the seismic blasting machine to an external system if the sensed electrical parameter indicates a successful detonation.

13. The seismic blasting machine of claim 12, wherein the at least one processor is programmed to report an unsuccessful detonation from the seismic blasting machine to the external system if the sensed electrical parameter does not indicate a successful detonation within the non-zero predetermined time after provision of the firing command.

14. The seismic blasting machine of claim 13, wherein the at least one processor is programmed to:
 read a shot point from the seismic detonator prior to causing the firing apparatus to provide the firing command; and
 selectively report an unsuccessful detonation including the shot point from the seismic blasting machine to the external system if the sensed electrical parameter does not indicate a successful detonation within the non-zero predetermined time after provision of the firing command.

15. The seismic blasting machine of claim 12, wherein the at least one processor is programmed to:
 read a shot point from the seismic detonator prior to causing the firing apparatus (28, 29) to provide the firing command; and
 selectively report a successful detonation including the confirmation time break value and the shot point from the seismic blasting machine to the external system if the sensed electrical parameter indicates a successful detonation.

16. A method for data reporting in a seismic blasting system, the method comprising:
 using a seismic blasting machine, electronically obtaining detonator data including at least one of a serial ID and a shot point from a connected seismic detonator;
 using the seismic blasting machine, determining whether the seismic detonator has been successfully detonated according to a reflected electrical signal generated by reflection from an impedance of the seismic detonator of an electrical signal provided by the seismic blasting machine, and wherein determining whether the sensed electrical parameter indicates a successful detonation comprises determining whether the reflected electrical signal ceases to be received by the seismic blasting machine within the non-zero predetermined time after provision of the firing command;
 if the seismic detonator has been successfully detonated, selectively identifying a confirmation time break value associated with the detonation;
 if the seismic detonator has not been successfully detonated, electronically reporting an unsuccessful detonation including transmission of the detonator data from the seismic blasting machine to an external system; and
 if the seismic detonator has been successfully detonated, electronically reporting a successful detonation including transmission of the detonator data from the seismic blasting machine to the external system.

17. The method of claim 16, wherein the external system is at least one of a remote recording facility, a data acquisition system, and a control system.

18. The method of claim 1, wherein the seismic detonator is an electronic detonator that includes an on-board firing circuit operable in response to receipt of the firing command to activate the electronic detonator.

19. The seismic blasting machine of claim 11, wherein the seismic detonator is an electronic detonator that includes an on-board firing circuit operable in response to receipt of the firing command to activate the electronic detonator.

* * * * *